April 20, 1926.
F. M. RIVAROLA
ANTISKIDDING DEVICE FOR MOTOR CAR WHEELS
Filed July 21, 1925  3 Sheets-Sheet 1
1,581,473
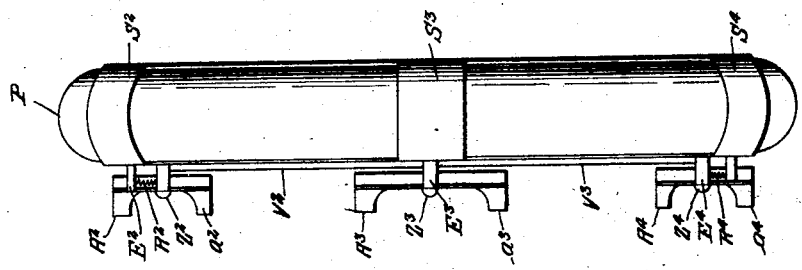
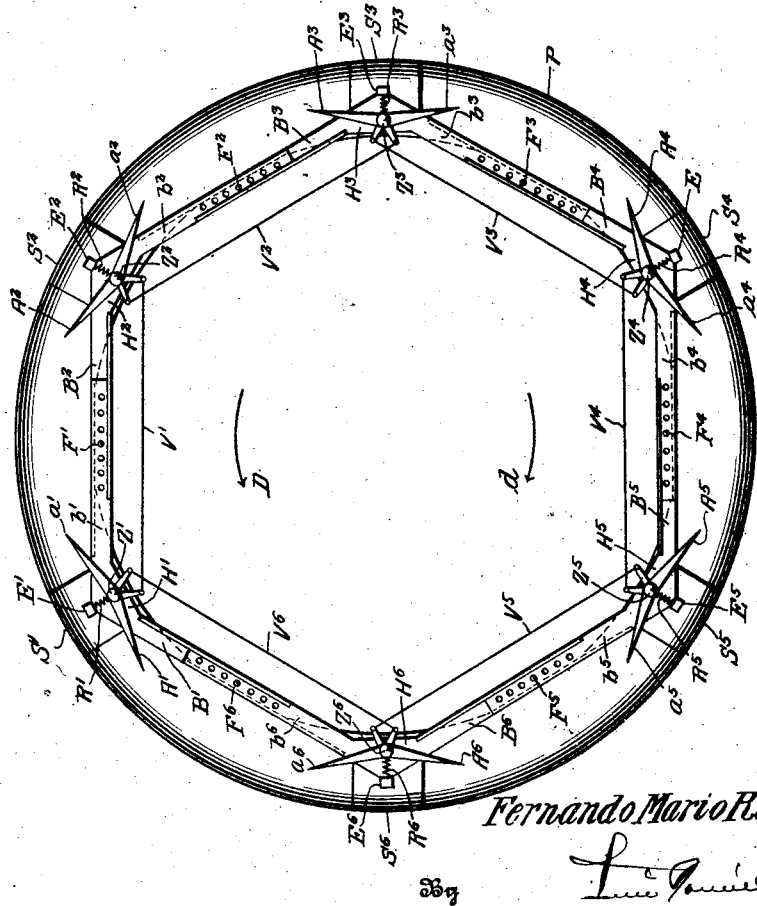
Inventor
Fernando Mario Rivarola April 20, 1926.
F. M. RIVAROLA
1,581,473
ANTISKIDDING DEVICE FOR MOTOR CAR WHEELS
Filed July 21, 1925     3 Sheets-Sheet 2
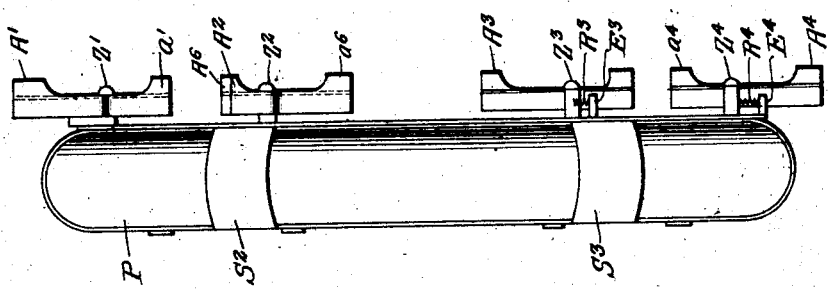
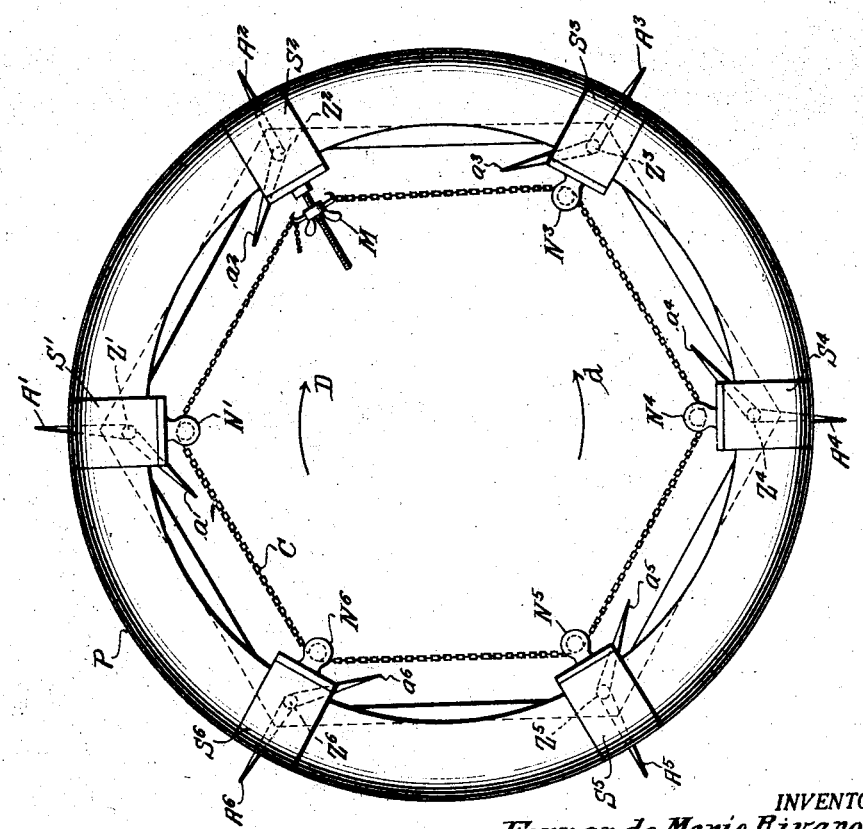
INVENTOR.
Fernando Mario Rivarola,
BY
ATTORNEY.

April 20, 1926.
F. M. RIVAROLA
1,581,473
ANTISKIDDING DEVICE FOR MOTOR CAR WHEELS
Filed July 21, 1925    3 Sheets-Sheet 3
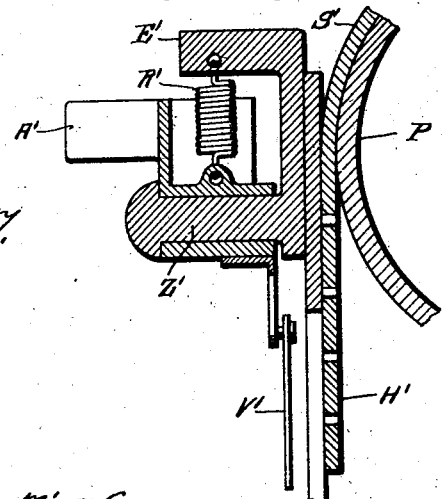
Fig. 7.
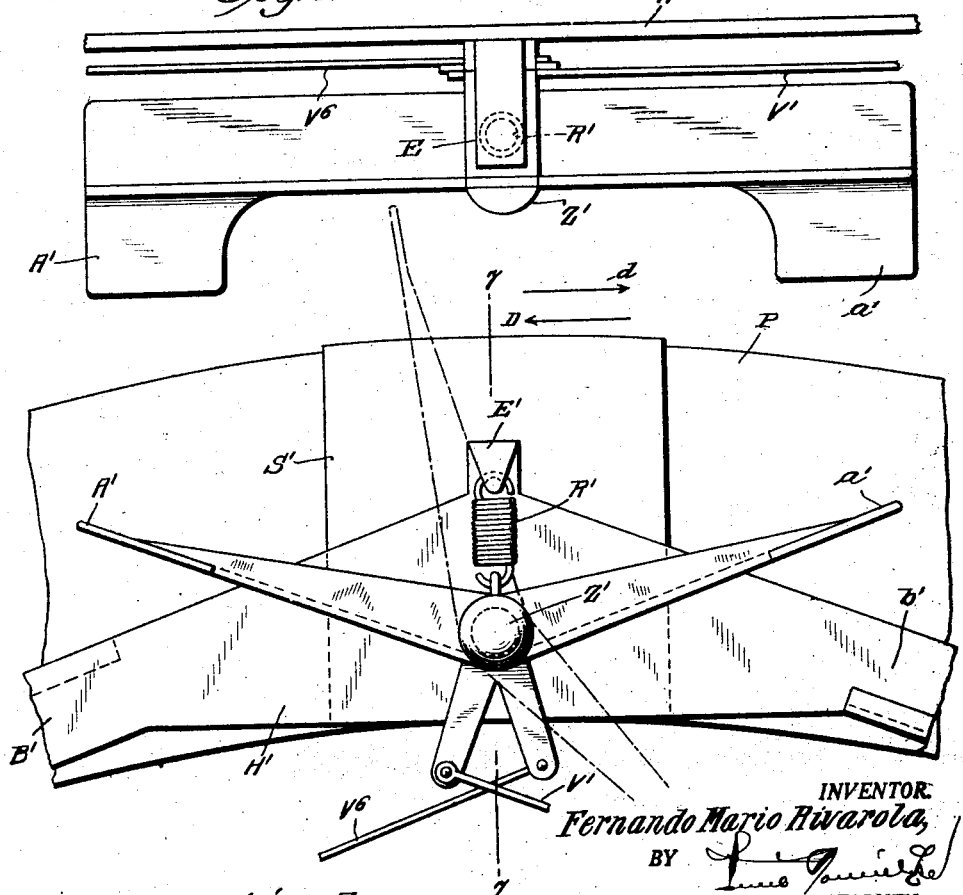
Fig. 6.
Fig. 5.
INVENTOR.
Fernando Mario Rivarola,
BY
ATTORNEY.

Patented Apr. 20, 1926.

1,581,473

UNITED STATES PATENT OFFICE.

FERNANDO MARIO RIVAROLA, OF BUENOS AIRES, ARGENTINA.

ANTISKIDDING DEVICE FOR MOTOR-CAR WHEELS.

Application filed July 21, 1925. Serial No. 45,097.

*To all whom it may concern:*

Be it known that I, FERNANDO MARIO RIVAROLA, citizen of the Republic of Argentina, residing at 2211 Coronel Diaz Street, Buenos Aires, Argentina, have invented certain new and useful Improvements in Antiskidding Devices for Motor-Car Wheels, of which the following is a specification.

The present invention relates to attachments for the wheels of motor vehicles, particularly their motor or driving wheels, to facilitate their passage over marshy, soft and heavy ground, which devices are automatically put into and out of action when the vehicle enters or leaves such ground.

In order that the invention may be clearly understood and easily carried into practice, a preferred embodiment thereof has been shown by way of example in the appended drawings, wherein—

Figures 1 and 3 are opposite face views of a wheel equipped with the invention, Fig. 1 showing the devices in inactive or normal position, and Fig. 3 showing them in active or working position;

Figs. 2 and 4 are corresponding edge views thereof;

Figs. 5 and 6 show, on an enlarged scale, a detail of one of the main elements of the invention; and Fig. 7 is a sectional view on line 7—7 of Fig. 5.

Similar characters of reference denote the same or like parts throughout the said drawings.

The device according to the invention consists of a given number (six in the drawings) of pairs of movable blades $A'$ $a'$, $A^2$ $a^2$, $A^3$ $a^3$, . . . which may freely turn upon pivot pins or studs $Z'$, $Z^2$, $Z^3$ . . . simultaneously as shown, or independently of each other. The blades are retained in their normal position by the action of the springs $R'$, $R^2$, $R^3$ . . . and may be interconnected by rods $V'$, $V^2$, $V^3$ . . . which allow a unitary action thereof.

The pins Z may be directly fixed to the rim of the wheel, should the rim have the necessary openings, or they may be fixed to a supplementary device, as shown in the drawings, which may be fitted to any type or size of wheel. This device consists of a skeleton supporting frame formed by a number of elements corresponding to the number of pairs of blades, each of the said elements being constituted by two arms $B'$ $b'$, $B^2$ $b^2$, $B^3$ $b^3$, . . . connected by means of angular reinforcements $H'$, $H^2$, $H^3$ . . . on which the pins $Z'$ . . . are mounted. Stops $E'$, $E^2$, $E^3$ . . . are used on said reinforcements $H'$ . . . in order to limit the movement of the blades, and they constitute at the same time a guard or protection against the blows which the blades might suffer when running on stony or deeply cut ground; the aforesaid reinforcements also serving to support the springs $R'$. . . . The arms of each of the two-armed elements are capable of sliding upon those of the adjacent elements and they are adjusted in position by means of bolts $F'$, $F^2$, $F^3$ . . . or the like, according to the size of the wheel, the whole system being then perfectly adjusted and ready to be placed in position.

The attachment of the system upon the wheel is effected by means of the spring clamps $S'$, $S^2$, $S^3$ . . . which, on being adjusted upon the tire P, give to the system a suitable elasticity which is very convenient on account of the blows which it is liable to receive. These clamps are fixed at one end to the angular reinforcements $H'$ . . . and at their other end they carry small pulleys $N'$, $N^2$, $N^3$ . . . over which a chain C passes, the ends of said chain being fixed to a wing nut M which, on being turned, enables a perfect adjustment of the device upon the wheel to be obtained. The chain-and-pulley system is arranged within the confines of the wheel, so to say, in such a manner as to avoid interference with the spokes or the like, and is represented in Fig. 3; but it is omitted from Fig. 1 for convenience of illustration and to avoid confusion.

The operation is as follows: On skidding and when the wheel sinks a few centimeters into the ground, the very pressure exerted by the ground against the blades A or against the blades $a$, according as the vehicle moves forward or backward, as indicated by the arrows D or $d$, (Fig. 5), forces said blades to turn upon their pivots until they strike against the stops E, in which position they project beyond the tire and enter into the ground. The springs R, which are thereby tensioned, produce a return or backward movement of said blades to their original position as soon as the wheel gets out of the ground. Fig. 5 shows in full lines a pair of blades in normal position—that is, when the blades are out of action, and in dotted lines, a pair of blades in working position.

A greater efficiency may be obtained by using the articulated rods V, as they keep the blades in their working position when the system is in action.

Modifications and changes of various kinds may be introduced without departing from the scope of the invention as claimed.

I claim as my invention:

1. An anti-skidding attachment, comprising a plurality of blades adapted to be attached laterally to a vehicle wheel; said blades being movable into operative position by the resistance offered to them by the ground when the wheel sinks into or skids on the ground, and being automatically moved into inoperative position when the wheel leaves the ground.

2. An anti-skidding attachment, comprising a plurality of pivotally-mounted two-armed blades adapted to be attached laterally to a vehicle wheel; said blades being rockable into operative position by the resistance offered to them by the ground when the wheel sinks into or skids on the ground, and being automatically rocked backward into inoperative position when the wheel leaves the ground.

3. An anti-skidding attachment according to claim 2, in which the blades are carried by a skeleton supporting frame arranged against and secured to one side of the wheel.

4. An anti-skidding attachment, comprising a plurality of pivotally-mounted two-armed blades adapted to be attached laterally to a vehicle wheel; said blades being rockable into operative position by the resistance offered to them by the ground when the wheel sinks into or skids on the ground, and being automatically rocked backward into inoperative position when the wheel leaves the ground; and transmission rods interconnecting said blades to cause them to move in unison.

5. An anti-skidding attachment, comprising a skeleton supporting frame adapted to be positioned against one face of a vehicle wheel, a plurality of two-armed blades pivotally connected to said frame for movement into and out of active position, and a series of clamps attached to said frame for engagement with the wheel to secure the frame thereto.

6. An anti-skidding attachment, comprising a skeleton supporting frame adapted to be positioned against one face of a vehicle wheel, a plurality of two-armed blades pivotally conected to said frame for movement into and out of active position, and a series of U-shaped spring clamps attached to said frame and adapted to straddle the tire of the wheel to secure the frame to the wheel.

7. An anti-skidding attachment, comprising a skeleton supporting frame adapted to be positioned against one face of a vehicle wheel, a plurality of ground-engaging blades pivoted to the frame for movement into and out of active position, a set of clamps connected to the frame and adapted to engage the wheel and thereby secure said frame thereto, and a flexible element engaging all the clamps to hold them in place.

8. An anti-skidding attachment according to claim 7, in which an adjusting device is connected to the end of the flexible element to regulate its tension.

In testimony whereof I affix my signature.

FERNANDO MARIO RIVAROLA.